July 28, 1970 B. O. AYERS 3,521,657

VARIABLE IMPEDANCE VORTEX DIODE

Filed Dec. 26, 1967 3 Sheets-Sheet 1

INVENTOR.
B. O. AYERS

BY Young & Quigg

ATTORNEYS

VARIABLE IMPEDANCE VORTEX DIODE

Filed Dec. 26, 1967 3 Sheets-Sheet 2

INVENTOR.
B. O. AYERS

BY Young & Quigg

ATTORNEYS

INVENTOR.
B.O. AYERS

BY Young & Quigg

ATTORNEY

United States Patent Office 3,521,657
Patented July 28, 1970

3,521,657

VARIABLE IMPEDANCE VORTEX DIODE

Buell O. Ayers, Bartlesville, Okla., assignor to Phillips Petroleum Company, a corporation of Delaware Filed Dec. 26, 1967, Ser. No. 693,304
Int. Cl. F15c 1/16
U.S. Cl. 137—81.5 10 Claims

ABSTRACT OF THE DISCLOSURE

In a vortex diode the impedance to a flow can be varied by adjusting the angle of the flow into the diode. The angle of the inlet conduit can be physically changed, or effectively changed by selecting one or more of a plurality of inlet conduits having different inlet angles. Two such diodes can be connected in a back-to-back manner to produce a bidirectional variable restrictor wherein the impedance to the flow may be adjusted in both directions. The bidirectional variable restrictor can be used in any system where flow is in a bidirectional or alternating manner, particularly where there is a need for an impedance matching.

BACKGROUND OF THE INVENTION

This invention relates to a vortex diode. In one aspect this invention relates to a vortex diode for use in a fluid system wherein the value of the impedance in the diode can be varied.

In another aspect, this invention relates to the placing of two variable vortex diodes in a back-to-back relationship to produce a bidirectional variable restrictor in which the impedance to flow in either direction can be varied.

Within the past few years a new technology has developed which allows controlling a system by the use of fluids. In certain instances such systems can replace mechanical or electrical systems. There have been several passive elements developed for use in fluid systems, examples of which are resistors, inductors, capacitors and diodes which perform functions in a fluid system analogous to their named counterparts in an electronic system. In the fluid system, mass flow can be considered analogous to current, and fluid pressure to voltage. Therefore, as an example, an electrical resistor in an electrical circuit will have a voltage drop across it while in a fluid system a fluid resistor will have a pressure drop across it.

Fluid vortex diodes which have a large impedance to flow in one direction and a small impedance to flow in the other direction are known in the art. A conventional vortex diode is illustrated in FIG. 23, page 168 of Machine Design, June 24, 1965, vol. 37. In the use of these vortex diodes within a fluid system there is only one, fixed value for impedance in each direction. In certain fluid systems it may become desirable or necessary that various values of impedances be utilized during the operation for reasons similar to those requiring use of a variable resistor in an electrical circuit.

In accordance with one aspect of the invention it has been discovered that if the angle of flow of the fluid into the vortex diode is variable or adjustable from the tangential direction to the radial direction, a range of values of impedance can be obtained, ranging from a large impedance when the inlet flow is in a tangential direction to a small impedance when the inlet flow is in a radial direction.

In accordance with another aspect of the invention, it has been discovered that by placing two variable impedance vortex diodes in a back-to-back fashion the impedance can be adjusted in both directions, thereby producing a bidirectionally variable impedance element.

Accordingly, it is an object of the present invention to provide a vortex diode which has a variable impedance to flow in one direction. It is a further object of the invention to provide a bidirectionally variable restrictor in which the impedance to the flow can be varied in either or both directions.

Other objects, aspects and advantages of the invention will be apparent from a study of the disclosure, the drawings and the appended claims to the invention.

DESCRIPTION OF THE PREFERRED EMBODIMENT

Figure 2:
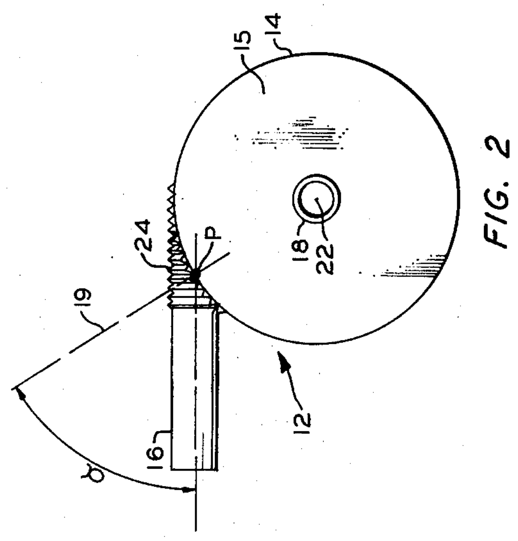
FIG. 2 is a side view of the vortex diode shown in FIG. 1.
Figure 1:
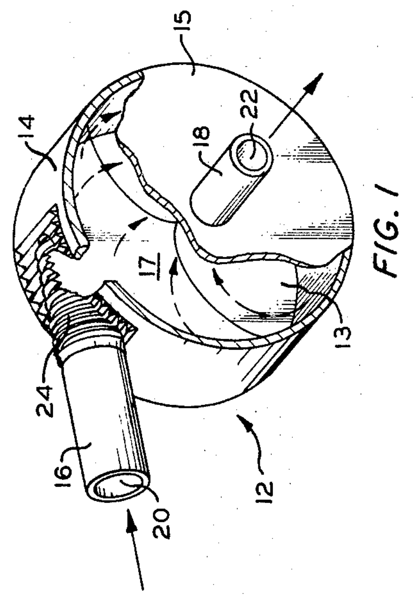
FIG. 1 is a perspective view, partly in cross section, of a vortex diode in accordance with the present invention.

Referring to FIG. 1, a vortex diode 12 is made up of a substantially cylindrical wall member 14 having opposite end wall members 13 and 15, a conduit member 16 and a conduit member 18. Conduit member 18 is positioned perpendicularly to end member 15 and is coaxial with cylindrical member 14. Conduit members 16 and 18 have passageways 20 and 22 through which the fluid either enters or leaves diode 12. Conduit member 16 is connected to member 14 by a corrugated member 24 which allows the conduit member 16 to be pivoted about point P through an angle $\alpha$ with respect to line 19 which is radial to cylindrical member 14 as shown in FIG. 2. Point P is located at the intersection of an imaginary line drawn along the inner circumference of cylindrical wall member 14 and an imaginary line drawn along the axis of conduit member 16. When $\alpha=0°$ conduit member 16 is radially positioned with respect to member 14. and when $\alpha$ is as shown in FIG. 2 conduit member 16 is tangentially positioned with respect to member 14. This latter value of the angle $\alpha$ would be 90° if conduit 16 were considered as a line, but the physical diameter of conduit 16 reduces the value to less than 90°.

When the above vortex diode is placed in a fluid system the fluid can flow either through passageway 20 into the cylindrical chamber 17 formed by member 14, and out passageway 22 as shown by the arrows in FIG. 1, or the flow can go in the reverse direction, that is, through passageway 22 into the cylindrical chamber 17 formed by member 14 and out passageway 20. When conduit 16 is in the tangential position shown in FIG. 2, and when fluid is flowing in the direction where it enters by way of passageway 20, there will be a high impedance to the flow thereby causing a large pressure drop between inlet 20 and outlet 22. This is due to the fact that the flow enters chamber 17 tangentially to the curved cylinder wall 14 and a vortex is thereby formed. The dashed lines in FIG. 1 show the approximate path of flow when this vortex is formed. As the flow spirals closer to outlet conduit 18 the radius of the rotating fluid decreases, and tangential velocity of the rotated fluid increases because of conservation of angular momentum. Shear stresses in the rotating fluid lead to a pressure drop in the fluid as it spirals inwardly and an impedance to the flow occurs.

When the flow of the fluid in the vortex diode is in the direction so flow enters passageway 22, then the fluid will flow in a radial direction through chamber 17 toward the passageway 20 and there is small impedance encountered by the flow, and thus the pressure drop across chamber 17 is small.

When conduit member 16 is rotated about point P to the position where $\alpha$ equals 0°, the fluid which flows into opening 20 will enter chamber 17 in a radial direction toward pipe 18 and low impedance will be encountered. Also, when the fluid is flowing in the opposite direction, that is, when the fluid enters passageway 22 it will then flow in the radial direction and out passageway 20 through pipe 16. Therefore, when $\alpha$ equals 0°, the fluid flow is in a radial direction regardless of the direction of flow and the impedance in both directions will be small and approximately equal.

The vortex diode of the present invention has been described above in the two extreme conditions wherein the impedance to flow in the forward direction, that is in the direction so that the fluid enters by way of passageway 20, will be a maximum or a minimum. When pipe 16 or wall member 14 is rotated so that $\alpha$ is between the range of 0° to the tangential value, then the impedance to the flow in the forward direction will be between the maximum and minimum values therefor. Accordingly, by adjusting the angle $\alpha$ for conduit 16 the impedance to the flow can be varied.

Figure 4:
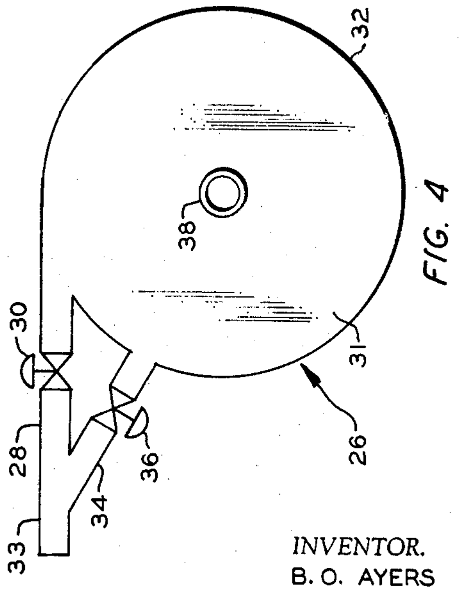
FIG. 4 is a side view of a vortex diode in accordance with a second embodiment of the present invention.

Referring now to FIG. 4, vortex diode 26 is provided with a conduit member 28 which contains an adjustable valve 30. Conduit member 28 is positioned so that the fluid flows into the chamber formed by cylindrical wall member 32 tangentially to the curved surface of member 32. A conduit member 34, containing an adjustable valve 36, is positioned so that one end is connected to cylindrical member 32 so that the flow from pipe 34 will enter the chamber formed by member 32 in a radial direction. An outlet conduit 38 is provided in end wall 31 coaxially with member 32, analogous to conduit 18 in FIG. 1. Conduit members 28 and 34 are connected to a common inlet conduit 33.

Figure 3:
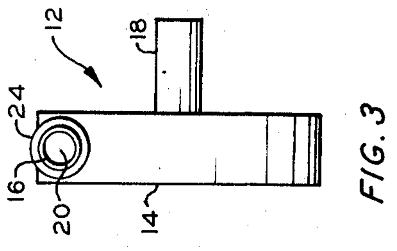
FIG. 3 is an end view of the vortex diode shown in FIG. 1.

When the flow from conduit 33 into the chamber formed by member 32 comes completely through conduit 28, that is, valve 30 is opened and valve 36 is closed, then there will be a high impedance to the flow due to its tangential entry as described above with respect to FIGS. 1 and 3. When valve 30 is closed and valve 36 is open, the flow from conduit 33 is entirely through conduit 34 and enters the chamber formed by member 32 in a radial direction, thereby encountering small impendance. By adjusting the valves 30 and 36 between the fully opened and fully closed conditions just described, the impedance to the flow may be adjusted to any intermediate value between the two limits. The impedance to the flow will increase as the ratio of flow in conduit 28 to the flow in conduit 34 increases. Either valve 30 or 36 could be employed without the other and the impedance would still be variable. However, using only one valve would narrow the range over which the impedance could be varied.

Figure 5:
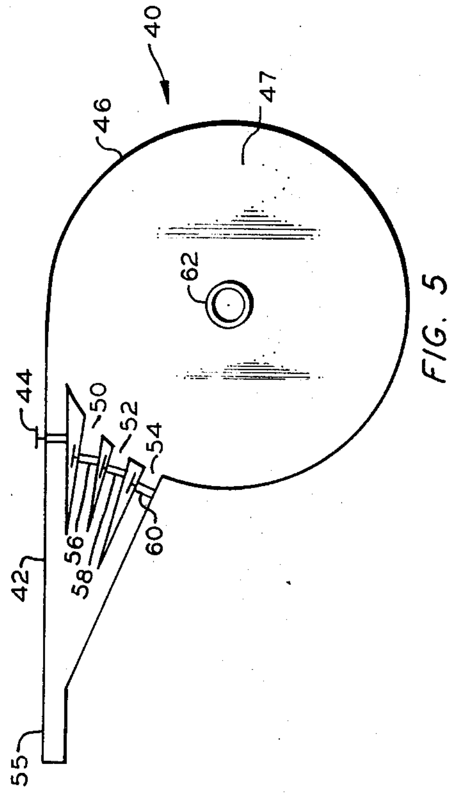
FIG. 5 is a side view of a vortex diode in accordance with a third embodiment of the present invention.

FIG. 5 illustrates a vortex diode 40 which is provided with a plurality of inlet conduit members 42, 50, 52 and 54 connected to a common inlet conduit 55. Conduit member 42, which contains an on-off valve 44, has the same tangential position with respect to a cylindrical member 46 as conduit 28 does to member 32 as described above with respect to FIG. 4. Conduits 50, 52 and 54 contain on-off valves 56, 58 and 60, respectively. Conduit 54 is connected to member 46 at an angle so that a fluid entering the chamber formed by member 46 from conduit 54 will flow into the chamber in a radial direction. Conduits 50 and 52 are connected to member 46 in such a way that fluid entering the chamber formed by member 46 from conduits 50 and 52 enters at different angles intermediate the tangential angle of conduit 42 and the radial angle of conduit 54. An outlet member 62 is placed in the center of end member 47 coaxial with member 46. While only four conduits 42, 50, 52 and 54 are shown in the drawing, any number of conduits at varying angles could be employed to achieve the desired variation of impedance to the flow. While a variable impedance to flow could also be achieved without the use of valve 44, the range of variation of the impedance would be narrowed.

In operation, when valves 56, 58 and 60 are closed and valve 44 is open, there is a maximum impedance to a flow moving in a direction wherein it enters conduit 55 and exits out conduit 62. With the same flow direction and valves 44, 56 and 58 closed and valve 60 open, there is a minimum impedance to the flow since the flow enters the chamber formed by member 46 in a radial direction. By opening and closing different combinations of the various valves 44, 56, 58 and 60, a variety of impedance values between the above-explained minimum and maximum values can be obtained. For example, a different impedance would be obtained when valve 56 was opened and valves 44, 58 and 60 were closed than when valve 58 was opened and valves 44, 56 and 60 were closed. While conduits 42, 50, 52 and 54 have been illustrated with substantially equal diameters, they can have different diameters. The various cross-sectional areas of the inlet conduits can be selected to achieve a desired series of impedance values, for example the cross-sectional areas of conduits 42, 50, 52 and 54 could be weighted in a binary manner with conduits 54, 22, 50 and 44 representing the values 1, 2, 4 and 8, respectively. This type of vortex diode could be used in a system where there is a control system which has only two values such as a binary signal as produced by a digital computer. The on-off valves could regulate the impedance to the flow responsive to the binary signal. Either the open position or the off position could be assigned the value of 0 and the remaining valve position the value 1. In this manner by opening certain valves and closing others, the impedance could be regulated as described above.

Figure 6:
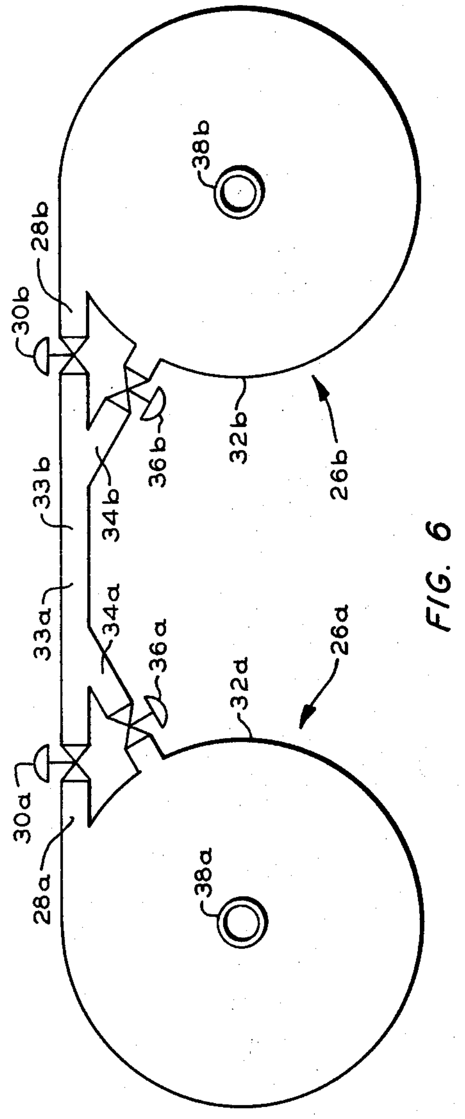
FIG. 6 is a side view of two vortex diodes in accordance with the present invention, placed in a back-to-back arrangement to produce a bidirectionally variable restrictor.

FIG. 6 shows two vortex diodes 26*a* and 26*b*, each incorporating one embodiment of the present invention, placed in a back-to-back manner. The operation of each diode 26*a* and 26*b* is explained above for FIG. 4, wherein corresponding elements have the same number. It is understood that while the embodiment of the invention shown in FIG. 4 is used for this back-to-back configuration, any two of the above embodiments of the present invention or any combination thereof could be used in the back-to-back configuration.

Flow entering an opening 38*a* in diode 26*a* will encounter the small reverse impedance in diode 26*a* but will meet the adjustable forward impedance in diode 26*b* as explained above before leaving an opening 38*b*. When flow is in the opposite direction, that is the flow enters opening 38*b*, there will be little reverse impedance encountered by the flow in diode 26*b* but the flow will encounter the adjustable forward impedance in diode 26*a* before passing out of opening 38*a*. Therefore, the configuration of vortex diodes shown in FIG. 6 provides for a bidirectionally variable restrictor wherein the impedance to the flow in either of two directions can be individually adjusted to different values.

Figure 7:
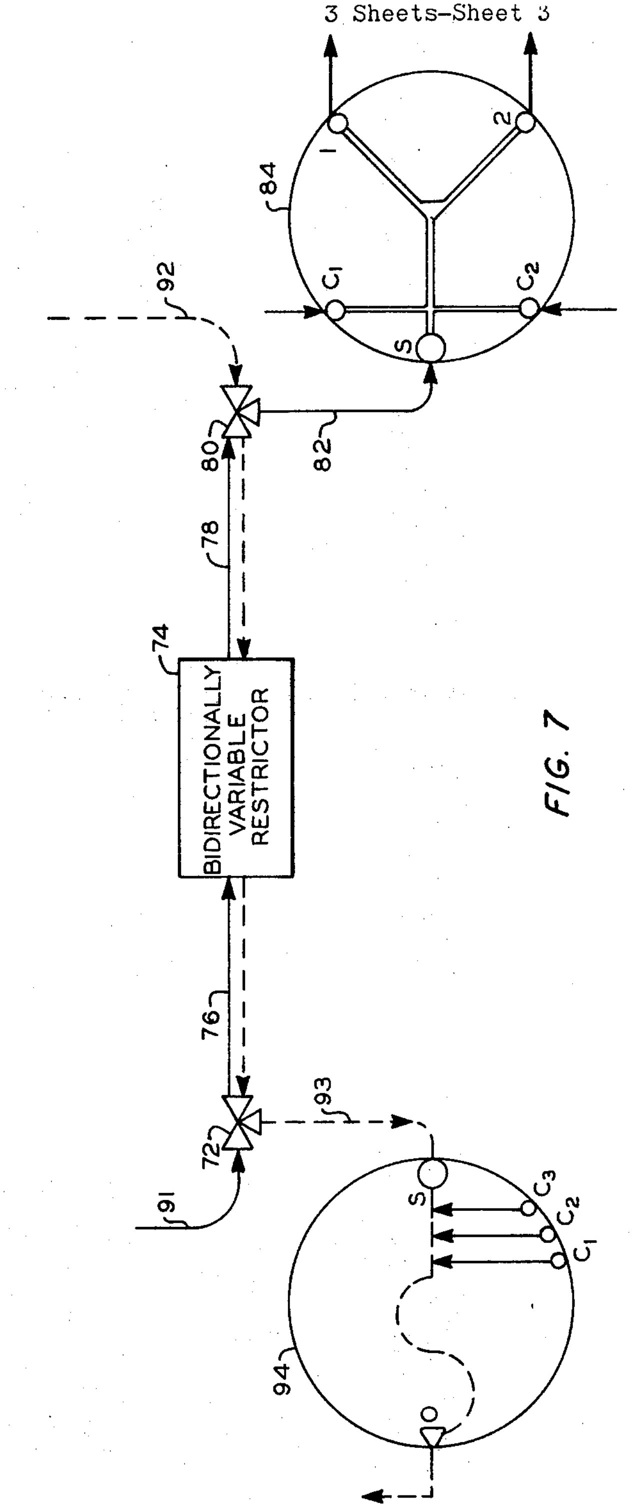
FIG. 7 is a diagrammatic representation of a fluid circuit wherein a bidirectionally variable restrictor of the present invention is used.

FIG. 7 illustrates a fluid system wherein the bidirectionally variable flow resistrictor can be used. The system has two independent direct transfer fluid flow streams, one being represented by solid lines with arrows and the second direction being represented by dashed lines with arrows where the arrows indicate the direction of the fluid flow. The two flow paths have three-way valves 72 and 80 and bidirectionally variable restrictor 74 in common. The three-way valve means 72 is connected to bidirectionally variable restrictor means 74, of a type such as shown in FIG. 6, via line 76. Line 76 will be connected to an opening in restrictor means 74 such as opening 38*a* as shown in FIG. 6. Restrictor means 74 is then connected via line 78 to a three-way valve 80, with line 78 being connected to an opening in restrictor means 74 such as opening 38*b* as shown in FIG. 6. The inlet conduit 91 for the first fluid stream is connected to one part of valve 72 while conduit 82 connects three-way valve 80 to an active fluid element such as a wall attachment amplifier 84 of the type shown in FIG. 1, page 156, Machine Design, June 24, 1965, vol. 37. The inlet conduit 92 for the second fluid stream is connected to one part of valve 80 while conduit 93 connects three-way valve 72 to an active fluid element such as a turbulence amplifier 94 of the type shown in FIG. 8, page 160, Machine Design, supra. The outputs and other inputs of both amplifiers 84 and 94 can be connected to other fluid elements depending upon the operation and requirements of the fluid system. The use of the bidirectionally variable flow restrictor 74 allows the pressure drop to be adjusted in both streams of the system in order that the total pressure drop in each stream will be equal. The pressure drop through the stream when flowing in the direction of the solid line and the pressure drop through the stream when in the direction of the dashed line will be respectively:

$$P_{ts}=P_{v1}+P_{c1}+P_{rs}+P_{c2}+P_{v2}+P_{a1} \quad (1)$$

$$P_{td}=P_{v2}+P_{c2}+P_{rd}+P_{c1}+P_{v1}+P_{a2} \quad (2)$$

wherein:

$P_{ts}$=Total pressure drop in the stream flowing in the direction of the solid line,
$P_{td}$=Total pressure drop in the system flowing in the direction of the dashed line,
$P_{v1}$=Pressure drop due to valve 72,
$P_{v2}$=Pressure drop due to valve 80,
$P_{c1}$=Pressure drop due to conduit 76,
$P_{c2}$=Pressure drop due to conduit 78,
$P_{rs}$=Pressure drop in the bidirectionally variable flow restrictor in the direction of the dashed line,
$P_{rd}$=Pressure drop in the bidirectionally variable flow restrictor in the direction of the dashed line,
$P_{a1}$=Pressure drop due to amplifier 84, and
$P_{a2}$=Pressure drop due to amplifier 94.

Since the total pressure drop in each flow direction is to be equal, the right-hand portion of these two equations can be set equal to each other to obtain:

$$P_{v1}+P_{c1}+P_{rs}+P_{c2}+P_{v2}+P_{a1} =P_{v2}+P_{c2}+P_{rd}+P_{c2}+P_{v1}+P_{a2} \quad (3)$$

Cancelling out the pressure drops on each side of the equation which are equal, we obtain:

$$P_{rs}+P_{a1}=P_{rd}+P_{a2} \quad (4)$$

Since in the normal system the amplifiers 84 and 94 will not have equal pressure drops, the impedance in each vortex diode will be adjusted as described above with respect to FIG. 6 in order to balance the two sides of Equation 4 to make the pressure drops in each system equal.

Figure 8:
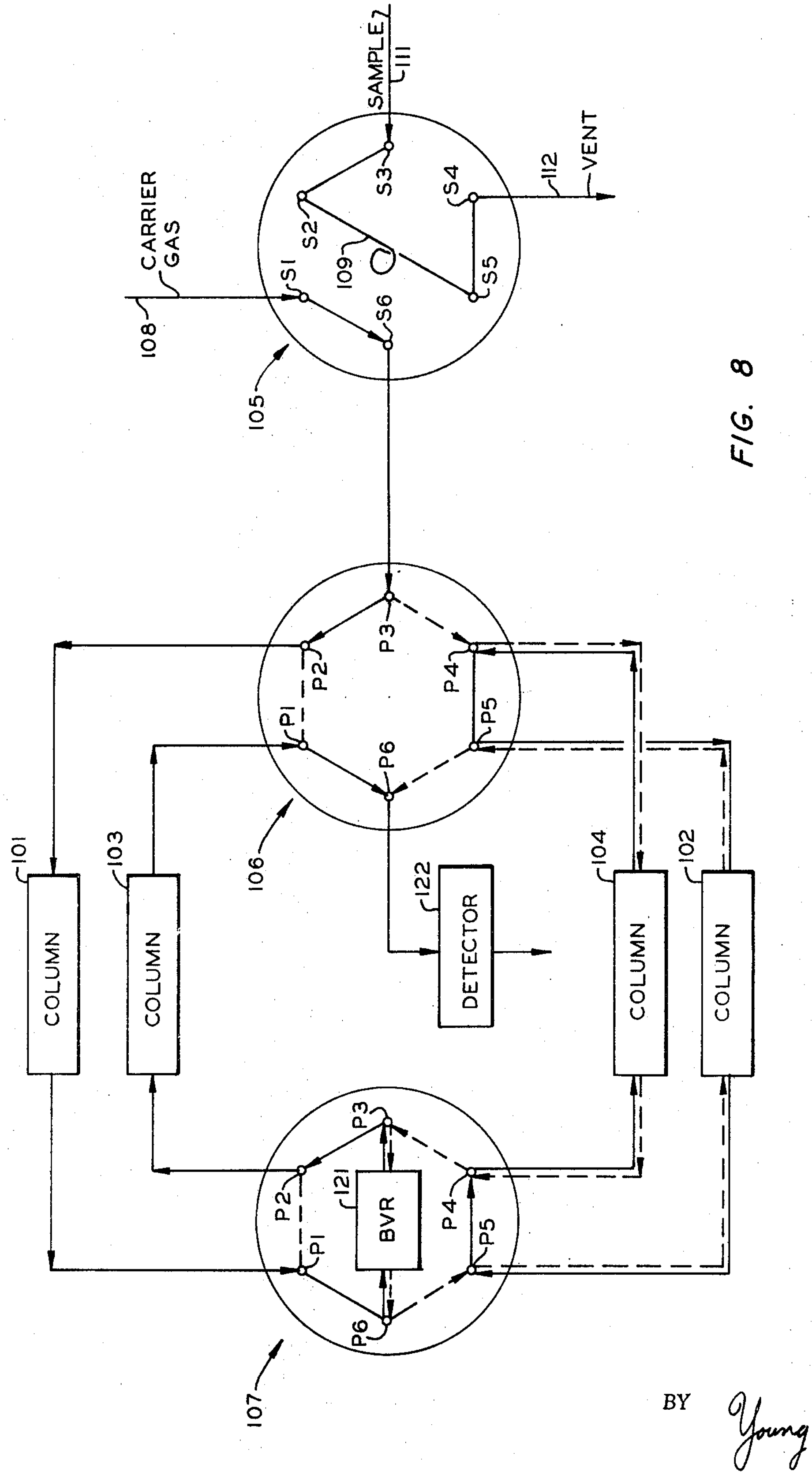
FIG. 8 is a digrammatic representation of a multi-column chromatograph utilizing a bidirectionally variable restrictor of the present invention.

Referring now to FIG. 8, there is illustrated a chromatographic analysis system utilizing chromatographic columns 101, 102, 103 and 104 and six port, two position valves 105, 106 and 107. Carrier gas is supplied through conduit 108 to the first port S1 of valve 105 a sample loop 109 is connected between ports S2 and S5 while a sample stream 111 is connected to the port S3 and the port S4 is connected to a vent 112. The port S6 of sample valve 105 is connected to the inlet port P3 of valve 106. In the first position of valve 105, which is the position illustrated in the drawing, sample fluid from conduit 111 passes from port S3 to port S2 and through sample loop 109 to port S5 and then through port S4 to vent 112, while carrier gas from conduit 108 flows through port S1 to port S6. In the second position of valve 105, sample fluid from conduit 111 flows from port S3 to port S4 and out vent 112, while carrier gas from conduit 108 flows from port S1 to port S2, through sample loop 109 to port S5 and then to port S6.

Column 101 is connected between port P2 of valve 106 and port P1 of valve 107; column 102 is connected between port P5 of valve 106 and port P5 of valve 107; column 103 is connected between port P1 of valve 106 and port P2 of valve 107; and column 104 is connected between port P4 of valve 106 and port P4 of valve 107. A bidirectionally variable restrictor 121, of the type illustrated in FIG. 6, is connected between ports P3 and P6 of valve 107. Port P6 of valve 106 is connected to a chromatographic detector 122.

In the first positions of valves 106 and 107, illustrated by the solid lines in FIG. 8, fluid flows from inlet port P3 of valve 106 through column 101, bidirectionally variable restrictor 121, and column 103 to detector 122. In the second position of valves 106 and 107, illustrated by the dashed lines, fluid flows from inlet port P3 of valve 106 through column 104, bidirectionally variable restrictor 121 and column 102 to detector 122. The flow through restrictor 121 for the first valve position is opposite that for the second valve position. The bidirectionally variability of restrictor 121 permits maintaining the pressure drop through the two different flow paths substantially equal to each other.

I claim:

1. A variable impedance device for use in a fluid system comprising a chamber means having a chamber formed by a substantially cylindrical side wall and first and second end walls, said chamber means being provided with an outlet means locate in said first end wall substantially coaxially with said side wall, a first conduit means adapted for connection to a fluid supply, inlet means for introducing fluid into said chamber and connected between said first conduit means and said chamber means, said inlet means being a second conduit means having an end portion which is flexibly connected to said chamber means so that relative movement between said chamber means and said inlet means can vary the angle at which the fluid from said inlet means enters said chamber from tangential to said chamber to radial to said chamber.

2. A bidirectionally variable fluid restrictor comprising first and second variable impedance devices; each of said first and second impedance devices comprising a chamber means having a chamber formed by a continuously curved side wall and first and second end walls, said chamber means being provided with an outlet means, a first conduit means, inlet means for introducing fluid into said chamber and connected between said first conduit means and said chamber means, said inlet means being adjustable to vary the angle at which the fluid from said inlet means enters said chamber; the first conduit means of said first device being connected to the first conduit means of said second device, the impedance flow in the direction where the fluid enters the outlet means of said first device being controlled by the effective angular position of the inlet mans of said second device, the impedance to flow in the direction where the fluid enters the outlet means of said second device being controlled by the effective angular position of the inlet means of said first device.

3. A bidirectionally variable fluid restrictor in accordance with claim 2 wherein the side wall of each device is substantially cylindrical, and wherein the outlet means of each device is located in the respective first end wall substantially coaxially with the respective side wall.

4. A bidirectionally variable fluid restrictor in accordance with claim 3 wherein the inlet means of each device is a second conduit means having an end portion which is flexibly connected to the responsive chamber means so that relative movement between the respective chamber means and inlet means can vary the angle at which fluid from the respective inlet means enters the respective chamber from tangential to the respective chamber to radial to the respective chamber.

5. A bidirectionally variable fluid restrictor in accordance with claim 3 wherein the inlet means for each device comprises second and third conduit means individually connected between the respective first conduit means and the respective chamber means at different angles to the substantially cylindrical side wall, each of said second and third conduit means containing adjustable valve means, the second conduit means being located in a fixed position so that fluid enters the respective chamber from the respective second conduit means tangentially to the side wall of the respective chamber means, the third conduit means being located in a fixed position so that fluid enters the respective chamber from the third conduit means radially to the side wall of the respective chamber member, the impedance to the flow from the inlet means through the respective chamber increasing as the ratio of the flow in the respective second conduit means to the flow in the respective third conduit means increases.

6. A bidirectionally variable fluid restrictor in accordance with claim 3 wherein the inlet meants for each device comprises a plurality of second conduit means, each of said second conduit means containing valve means, one of each plurality of second conduit means being positioned so that flow enters the respective chamber therefrom at an angle tangential to the side wall of the respective chamber means, a second one of each plurality of second conduit means being positioned so that fluid enters the respective chamber therefrom at an angle radial to the side wall of the respective chamber means, each of the remaining ones of each plurality of second conduit means being positioned so that flow enters the respective chamber therefrom at an angle in the range between tangential and radial, the impedance to the fluid passing from the respective inlet means through the respective chamber being regulatable by the selective actuation of the valve means in the respective plurality of second conduit means.

7. A variable impedance device for use in a fluid system comprising a chamber means having a chamber formed by a substantially cylindrical side wall and first and second end walls, said chamber means being provided with an outlet means located in said first end wall substantially coaxially with said side wall, a first conduit means adapted for connection to a fluid supply, inlet means for introducing fluid into said chamber and connected between said first conduit means and said chamber means, said inlet means comprising second and third conduit means individually connected between said first conduit means and said chamber means at different angles to said substantially cylindrical side wall, each of said second and third conuit means containing adjustable valve means, said second conduit means being located in a fixed position so that fluid enters said chamber from said second conduit means tangentially to said side wall of said chamber means, said third conduit means being located in a fixed position so that fluid enters said chamber from said third conduit means radially to said side wall of said chamber member, the impedance to the flow from said inlet means through said chamber increasing as the ratio of the flow in said second conduit means to the flow in said third conduit means increases.

8. A variable impedance device in accordance with claim 7 further comprising at least one fourth conduit means individually connected between said first conduit means and said chamber means at an individually different angle intermediate the angles of said second and third conduit means, valve means operatively positioned in each said fourth conduit means, the impedance to the fluid passing from said inlet means through said chamber being regulatable by the selective actuation of the valve means in said second, third and fourth conduit means.

9. A variable impedance device in accordance with claim 8 wherein the valve means in each of said second, third and fourth conduit means is an on-off valve means.

10. A variable impedance device in accordance with claim 9 wherein the cross sections of the second, third and fourth conduit means are related to each other in a binary progression.

References Cited

UNITED STATES PATENTS

| | | | |
|---|---|---|---|
| 3,267,946 | 8/1966 | Adams et al. | 137—815 |
| 3,273,377 | 9/1966 | Testerman et al. | 137—815 XR |
| 3,276,259 | 10/1966 | Bowles et al. | 137—815 XR |
| 3,324,891 | 6/1967 | Rhoades | 137—815 XR |
| 3,373,759 | 3/1968 | Adams | 137—815 |
| 3,395,719 | 8/1968 | Boothe et al. | 137—815 XR |
| 3,398,759 | 8/1968 | Rose | 137—815 |
| 3,413,994 | 12/1968 | Sowers | 137—815 |

OTHER REFERENCES

"Generating Timed Pneumatic Pulses," R. E. Norwood, I.B.M. Technical Disclosure Bulletin, vol. 5, No. 9, February 1963, pp. 13, 14.

SAMUEL SCOTT, Primary Examiner